(12) United States Patent
Sato (10) Patent No.: US 11,114,957 B2
(45) Date of Patent: Sep. 7, 2021

(54) VACUUM PUMP AND MOTOR CONTROLLER

(71) Applicant: Edwards Japan Limited, Yachiyo (JP)

(72) Inventor: Kou Sato, Yachiyo (JP)

(73) Assignee: Edwards Japan Limited, Yachiyo (JP)

( * ) Notice: Subject to any disclaimer, the term of this patent is extended or adjusted under 35 U.S.C. 154(b) by 0 days.

(21) Appl. No.: 16/642,883

(22) PCT Filed: Aug. 24, 2018

(86) PCT No.: PCT/JP2018/031270
§ 371 (c)(1),
(2) Date: Feb. 27, 2020

(87) PCT Pub. No.: WO2019/049683
PCT Pub. Date: Mar. 14, 2019

(65) Prior Publication Data
US 2020/0204091 A1 Jun. 25, 2020

(30) Foreign Application Priority Data
Sep. 5, 2017 (JP) .............................. JP2017-170489

(51) Int. Cl.
*H02P 3/08* (2006.01)
*H02P 29/032* (2016.01)
(Continued)

(52) U.S. Cl.
CPC .............. *H02P 3/08* (2013.01); *F04D 19/042* (2013.01); *H02M 7/02* (2013.01); *H02P 29/032* (2016.02); *H02M 2001/0009* (2013.01)

(58) Field of Classification Search
CPC ........ H02P 3/08; H02P 29/032; F04D 19/042; H02M 7/02; H02M 2001/0009
See application file for complete search history.

(56) References Cited

U.S. PATENT DOCUMENTS

| 6,683,435 B1* | 1/2004 | Liang ................... B60L 3/0023 |
| | | 318/400.01 |
| 2010/0066294 A1* | 3/2010 | Hendrickson ........... H02P 9/006 |
| | | 318/490 |

(Continued)

FOREIGN PATENT DOCUMENTS

JP  H0275997 U  6/1990
JP  H0518417 A  1/1993

(Continued)

OTHER PUBLICATIONS

Translation of and original International Search Report and Written Opinion dated Nov. 20, 2018 in counterpart PCT application No. PCT/JP2018/031270, 7 pp.

(Continued)

*Primary Examiner* — Zoheb S Imtiaz
(74) *Attorney, Agent, or Firm* — Shumaker & Sieffert, P.A.

(57) ABSTRACT

A vacuum pump and a motor controller that make a safe transition to a regeneration mode while avoiding an overvoltage are provided. A turbo molecular pump includes a power supply unit that converts alternating-current power to direct-current power and outputs the power, the alternating-current power being obtained from an alternating-current power supply, and the motor controller that controls a motor. The motor controller includes: a motor driving circuit that drives the motor when receiving direct-current power or regenerated power; a backflow prevention diode interposed between the power supply unit and the motor driving circuit; a power-failure detection circuit that detects a primary voltage of the backflow prevention diode; a driving-voltage sensing circuit that detects a secondary voltage of the backflow prevention diode; and a motor control circuit that determines, when the primary voltage drops to a predetermined power-failure detection threshold value, whether a (Continued)

power failure is a primary power failure of the alternating-current power or a secondary power failure of the direct-current power based on a voltage difference between the primary voltage and the secondary voltage, and controls the motor driving circuit so as to enter a regeneration mode.

12 Claims, 5 Drawing Sheets

(51) Int. Cl.
  *F04D 19/04* (2006.01)
  *H02M 7/02* (2006.01)
  *H02M 1/00* (2006.01)

(56) References Cited

U.S. PATENT DOCUMENTS

| | | | |
|---|---|---|---|
| 2012/0212159 A1* | 8/2012 | Kitamoto | ............ B62D 5/0487 |
| | | | 318/139 |
| 2014/0306634 A1 | 10/2014 | Sakai | |
| 2015/0021060 A1 | 1/2015 | Tajima | |

FOREIGN PATENT DOCUMENTS

| JP | 2002147386 A | 5/2002 |
|---|---|---|
| JP | 2015105602 A | 6/2015 |

OTHER PUBLICATIONS

Extended Search Report from counterpart European Application No. 18853402.8, dated Apr. 23, 2021, 8 pages.

* cited by examiner

VACUUM PUMP AND MOTOR CONTROLLER

This application is a U.S. national phase application under 37 U.S.C. § 371 of international application number PCT/JP2018/031270 filed on Aug. 24, 2018, which claims the benefit of priority to JP application number 2017-170489 filed Sep. 5, 2017. The entire contents of each of international application number PCT/JP2018/031270 and JP application number 2017-170489 are incorporated herein by reference.

TECHNICAL FIELD

The present disclosure relates to a vacuum pump and a motor controller that controls the motor of the vacuum pump.

BACKGROUND

Conventionally, vacuum pumps are used for evacuating vacuum chambers into a high vacuum in equipment such as semiconductor manufacturing equipment, an electron microscope, and a mass spectroscope.

Such a vacuum pump is known as a turbo molecular pump (for example, see Japanese Patent Application Publication No. 2005-94852). The turbo molecular pump includes a rotor rotatably supported in a pump case. The rotor has rotor blades radially disposed in multiple stages on the outer surface of the rotor. The inner surface of the pump case is opposed to the rotor blades and has stator blades alternately placed in multiple stages between the rotor blades. When the rotor is rotated at a high speed after a vacuum chamber is decompressed to a certain degree, gas molecules having collided with the rotating rotor blades and the fixed stator blades are exhausted with a momentum. Through such exhaust, gas molecules sucked into a pump body from the vacuum chamber are exhausted while being compressed, achieving a desired high degree of vacuum in the vacuum chamber.

SUMMARY

Figure 5:
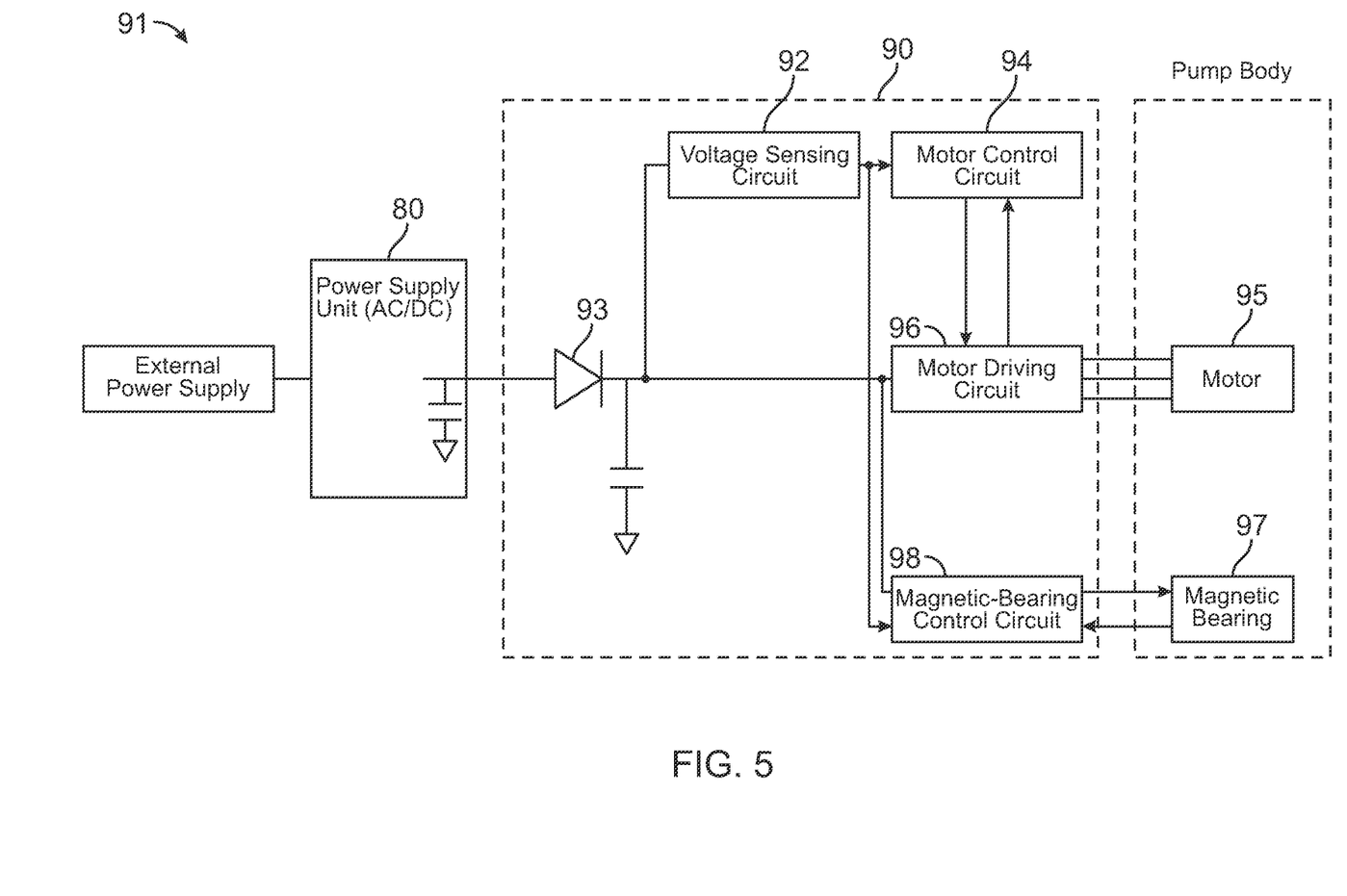
FIG. 5 is a block diagram of a vacuum pump including a motor controller according to a comparative example of the present disclosure.
Figure 6:
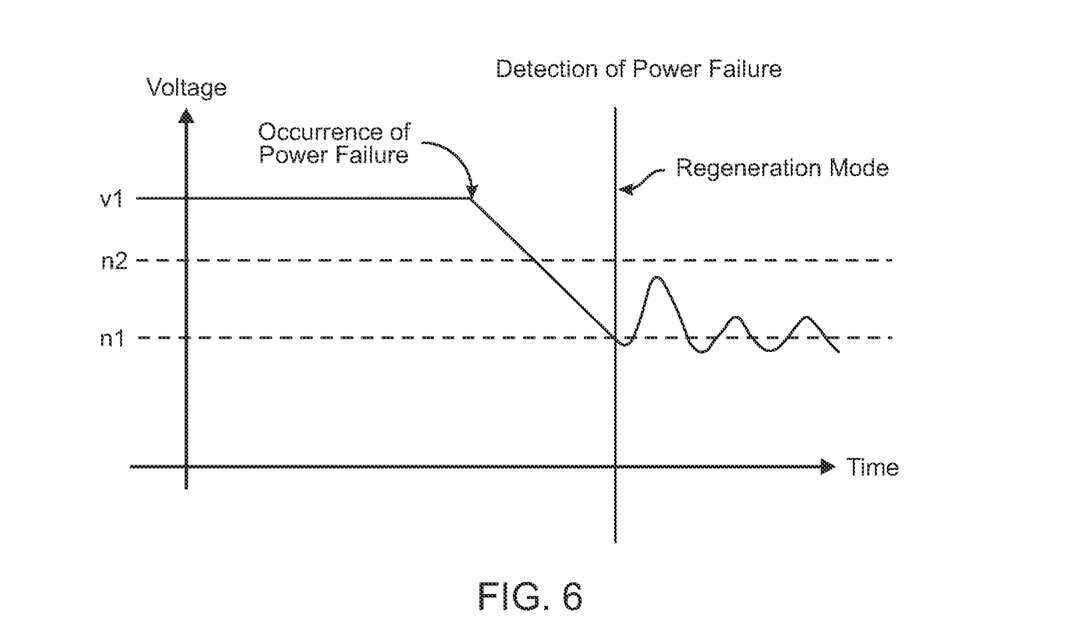
FIG. 6 indicates a change of voltage at a transition from a normal operation mode to a regeneration mode in the vacuum pump of FIG. 5.

In a vacuum pump 91 including a motor controller 90 as illustrated in FIGS. 5 and 6, when a secondary voltage v of a backflow prevention diode 93 drops to a power-failure detection threshold value n1, the secondary voltage v being detected by a voltage sensing circuit 92, a motor control circuit 94 determines that power has failed and enters a regeneration mode in which the regenerated power of a motor 95 rotates a rotor, which is not illustrated. In the regeneration mode, the regenerated power of the motor 95 is supplied as driving power for devices such as a motor driving circuit 96 for driving the motor 95, a magnetic bearing 97, and a magnetic-bearing control circuit 98 for driving the magnetic bearing 97. As indicated in FIG. 6, in the regeneration mode, a voltage v1 is controlled to match the target voltage of the regeneration mode after overshooting the target voltage at the time of switching to the regeneration mode. The target voltage in FIG. 5 matches the power-failure detection threshold value n1.

However, if an overshoot of the voltage v1 exceeds a power-restoration detection threshold value n2, the motor control circuit 94 determines that power has restored, that is, a power failure has been resolved and enters a normal operation mode from the regeneration mode, resulting in unstable control of the voltage v1.

The inventors found that erroneous detection of power restoration due to an overshoot can be avoided by determining a power failure or power restoration based on the voltage of power supplied to the motor controller 90 via an external power supply unit 80 instead of the voltage v1 in the motor controller 90.

Figure 7:
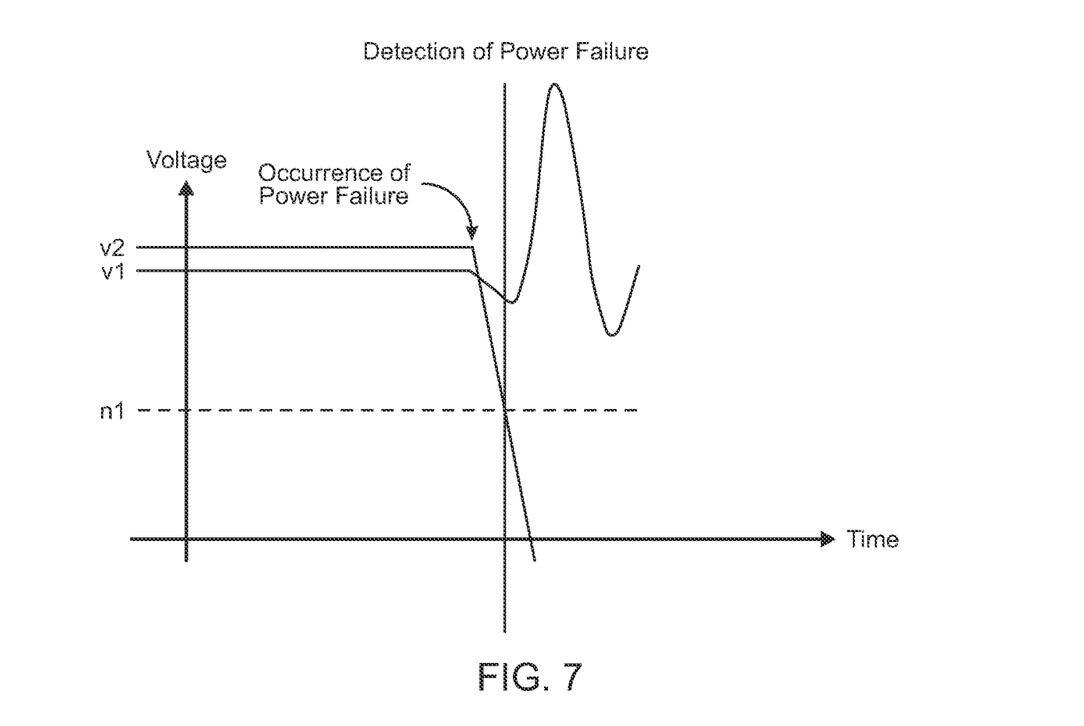
FIG. 7 indicates a change of voltage when an overvoltage occurs at a transition to the regeneration mode.

In the vacuum pump of FIG. 5, however, the voltage v1 drops to the power-failure detection threshold value n1 after a power failure, and then a transition is made to the regeneration mode. Thus, even if an overshoot occurs at the transition to the regeneration mode, overvoltage that may adversely affect the devices does not occur. In contrast, as indicated in FIG. 7, if it is determined whether a power failure has occurred or not based on a voltage v2 of power supplied to the motor controller 90, overvoltage may occur due to a transition to the regeneration mode before the voltage v1 in the motor controller 90 sufficiently drops.

The technical problem should be solved to make a safe transition to the regeneration mode while avoiding overvoltage. An object of the present disclosure is to solve the problem.

In order to solve the problem, a vacuum pump according to the present disclosure is a vacuum pump including a motor that generates regenerated power according to the rotation of a rotor during a power failure, the vacuum pump including a power supply unit that converts alternating-current power to direct-current power and outputs the power, the alternating-current power being obtained from an alternating-current power supply, and the motor controller that controls the motor, the motor controller including: a motor driving circuit that drives the motor when receiving the direct-current power or the regenerated power; a backflow prevention diode interposed between the power supply unit and the motor driving circuit; a power-failure detection circuit that detects a primary voltage of the backflow prevention diode; a driving-voltage sensing circuit that detects a secondary voltage of the backflow prevention diode; and a motor control circuit that determines, when the primary voltage drops to a predetermined power-failure detection threshold value, whether the power failure is a primary power failure of the alternating-current power or a secondary power failure of the direct-current power based on a voltage difference between the primary voltage and the secondary voltage, and controls the motor driving circuit so as to enter a regeneration mode in which the motor is driven by the regenerated power.

With this configuration, at the time of switching to the regeneration mode from a normal operation mode in which the vacuum pump is started by the power of an external alternating-current power supply, it is determined whether the power failure is the primary power failure (AC shutdown) of the alternating-current power or the secondary power failure (DC shutdown) of the direct-current power based on a voltage difference between the primary voltage and the secondary voltage of the backflow prevention diode, and then a transition is made to the regeneration mode. This can make a transition to the regeneration mode with a sufficient margin from the secondary voltage of the backflow prevention diode to an overvoltage, thereby suppressing the occurrence of an overvoltage caused by an overshoot of voltage at a transition to the regeneration mode.

Moreover, according to the vacuum pump of the present disclosure, if the motor control circuit determines that the power failure is the primary power failure, the motor control circuit preferably controls the motor driving circuit so as to immediately enter the regeneration mode.

With this configuration, when the primary voltage of the backflow prevention diode drops to a power-failure detection threshold value in the switching from the normal operation mode to the regeneration mode during the primary power failure, the secondary voltage of the backflow prevention diode also drops close to the power-failure detection threshold value. Thus, the normal operation mode can be quickly switched to the regeneration mode with a sufficient margin from the secondary voltage of the backflow prevention diode to an overvoltage.

According to the vacuum pump of the present disclosure, if the motor control circuit determines that the power failure is the secondary power failure, the motor control circuit preferably controls the motor driving circuit so as to enter the regeneration mode after the secondary voltage drops to a predetermined regeneration-mode transition threshold value.

With this configuration, if it is determined that the power failure is the secondary power failure, a transition is made to the regeneration mode after the secondary voltage of the backflow prevention diode drops to the predetermined regeneration-mode transition threshold value. Thus, a transition can be made to the regeneration mode with a sufficient margin from the secondary voltage of the backflow prevention diode to an overvoltage. This can suppress the occurrence of an overvoltage caused by an overshoot of voltage at a transition to the regeneration mode.

According to the vacuum pump of the present disclosure, if the motor control circuit determines that the power failure is the secondary power failure, the motor control circuit preferably controls the motor driving circuit so as to enter the regeneration mode after a lapse of a predetermined time from the start of a reduction of the secondary voltage.

With this configuration, if it is determined that the power failure is the secondary power failure, a transition is made to the regeneration mode after the lapse of the predetermined time from a reduction of the secondary voltage of the backflow prevention diode. Thus, a transition can be made to the regeneration mode with a sufficient margin from the secondary voltage of the backflow prevention diode to an overvoltage. This can suppress the occurrence of an overvoltage caused by an overshoot of voltage at a transition to the regeneration mode.

According to the vacuum pump of the present disclosure, the motor driving circuit preferably sets the maximum value of a current command value of the regeneration mode during the secondary power failure such that the maximum value is smaller than the maximum value of a current command value during the primary power failure.

With this configuration, an overshoot of voltage at a transition to the regeneration mode during the secondary power failure is smaller than that in the primary power failure. This can suppress the occurrence of an overvoltage caused by an overshoot of voltage even in secondary shutdown in which a margin from the secondary voltage of the backflow prevention diode to an overvoltage tends to decrease.

According to the vacuum pump of the present disclosure, the motor control circuit adjusts the maximum value of the current command value of the motor according to the rotational speed of the rotor at a transition to the regeneration mode.

With this configuration, as the rotational speed of the motor rises, the regenerated power increases but the need for optionally changing the control parameter of the motor control circuit according to fluctuations in regenerated power is eliminated by adjusting the maximum value of the current command value of the motor according to the rotational speed of the motor, achieving simple and general-purpose control.

In order to solve the problem, the motor controller according to the present disclosure is used for the vacuum pump configured thus.

With this configuration, at the time of switching to the regeneration mode from the normal operation mode in which the vacuum pump is started by the power of an external alternating-current power supply, it is determined whether the power failure is the primary power failure (AC shutdown) of the alternating-current power or the secondary power failure (DC shutdown) of the direct-current power based on a voltage difference between the primary voltage and the secondary voltage of the backflow prevention diode, and then a transition is made to the regeneration mode. This can make a transition to the regeneration mode with a sufficient margin from the secondary voltage of the backflow prevention diode to an overvoltage, thereby suppressing the occurrence of an overvoltage caused by an overshoot of voltage at a transition to the regeneration mode.

According to the present disclosure, when a power failure occurs and the normal operation mode is switched to the regeneration mode, it is determined whether the power failure is the primary power failure or the secondary power failure based on a voltage difference between the primary voltage and the secondary voltage of the backflow prevention diode. This transition to the regeneration mode suppresses the occurrence of an overvoltage caused by an overshoot of voltage at a transition to the regeneration mode, achieving a safe transition to the regeneration mode.

DETAILED DESCRIPTION

An embodiment of the present disclosure will be described below in accordance with the accompanying drawings. The number of constituent elements, numeric values, amounts, and ranges in the following description are not limited to specific numbers and may be equal to or larger or smaller than the specific numbers unless otherwise specified or clearly limited to the specific numbers in theory.

The shapes and positional relationship of the constituent elements substantially include close or similar shapes or the like unless otherwise specified or clearly excluded in theory.

Figure 1:
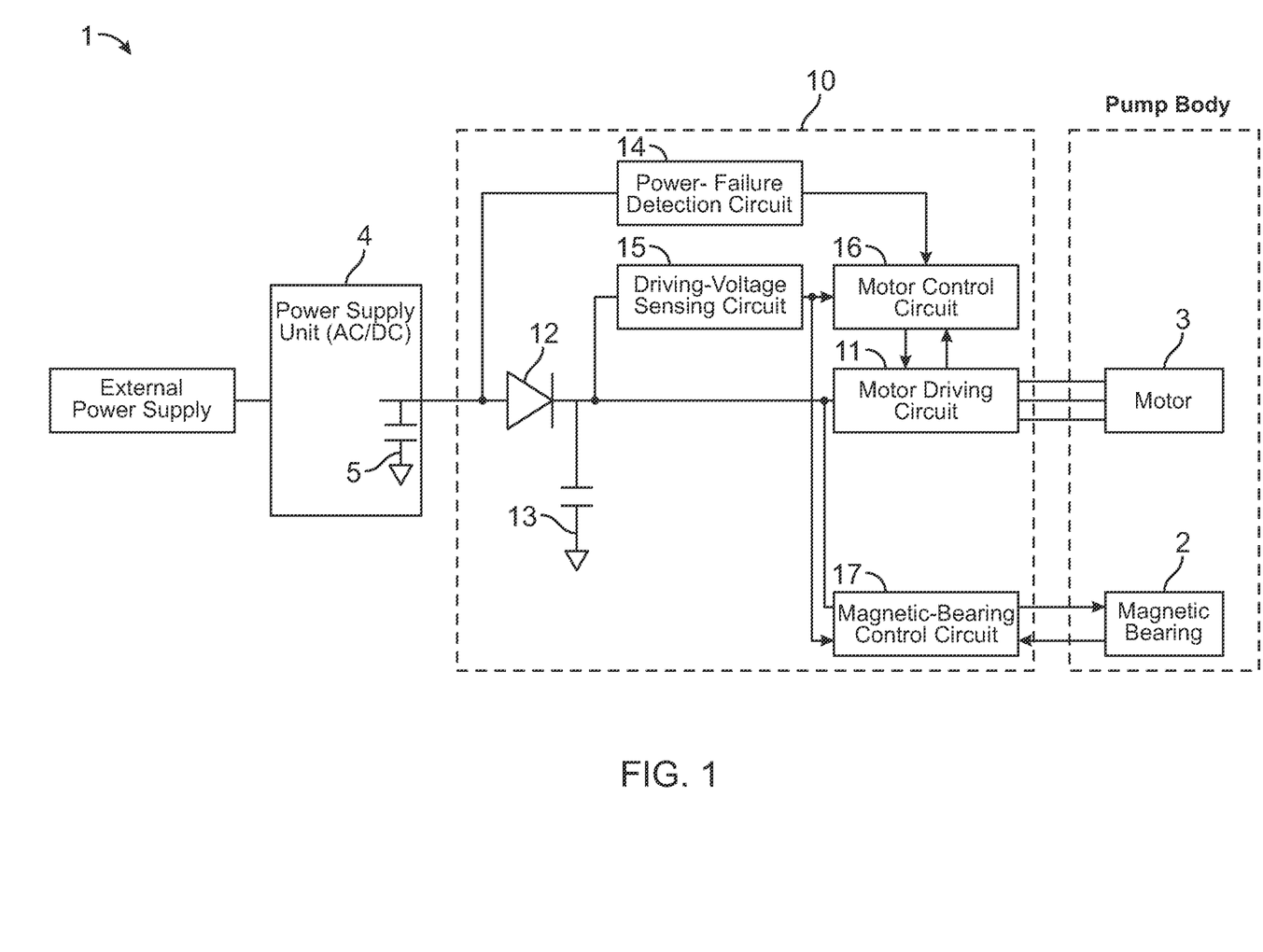
FIG. 1 is a block diagram of a vacuum pump including a motor controller according to an embodiment of the present disclosure.

FIG. 1 is a block diagram of a turbo molecular pump 1 including a motor controller 10 according to the present embodiment. The turbo molecular pump 1 includes a rotor (not illustrated) rotatably supported in a noncontact manner by a magnetic bearing 2. When the motor 3 rotates the rotor at high speed, gas molecules are exhausted with a momentum after colliding with rotor blades disposed in multiple stages on the outer surface of the rotor and stator blades alternately disposed in multiple stages between the rotor blades.

The magnetic bearing 2 includes an upper radial electromagnet and a lower radial electromagnet that radially support the rotor and an axial electromagnet that axially supports the rotor. The rotor floats under five-axis control.

The motor 3 includes a two-pole (north pole and south pole) permanent magnet (not illustrated) provided near the rotor and a three-phase motor winding (not illustrated) provided near a stator. Moreover, the motor 3 includes an RPM sensor (not illustrated) that detects the rotational speed of the rotor.

When feeding is stopped, the motor 3 acts as a power generator that generates regenerated power according to the rotation of the rotor. Since the motor 3 generates regenerated power, even during a power failure, the magnetic bearing 2 continuously supports the rotor that floats and rotates at high speed, thereby continuing a safe operation.

A power supply unit 4 externally connected to the motor controller 10 converts the alternating-current power (e.g., 24 V) of a commercial power supply to direct-current power and supplies the power to the motor controller 10. The power supply unit 4 includes a first smoothing capacitor 5 that smooths a voltage applied to the motor controller 10.

The motor controller 10 is incorporated into the turbo molecular pump 1. The motor controller 10 controls the operation of the motor 3.

A motor driving circuit 11 is connected to motor windings. Three inverter circuits are provided for the respective motor windings. The motor driving circuit 11 controls power supplied to the windings based on a drive signal transmitted from a motor control circuit 16, which will be described later. The motor driving circuit 11 includes a current sensor (not illustrated) that detects a current passing through the motor winding.

A backflow prevention diode 12 is interposed between the power supply unit 4 and the motor driving circuit 11. Reference numeral 13 denotes a second smoothing capacitor that smooths a voltage in the motor controller 10.

A power-failure detection circuit 14 detects a primary voltage of the backflow prevention diode 12. The power-failure detection circuit 14 transmits a detected voltage value to the motor control circuit 16.

A driving-voltage sensing circuit 15 detects a secondary voltage of the backflow prevention diode 12. The driving-voltage sensing circuit 15 transmits a detected voltage value to the motor control circuit 16.

The motor control circuit 16 controls the operation of the motor driving circuit 11. The motor control circuit 16 performs PID control based on the detected value of the RPM sensor, the detected value of the current sensor, a reference rotational speed, and a reference current value and generates the drive signal. The drive signal is transmitted to the motor driving circuit 11.

The motor controller 10 further includes a magnetic-bearing control circuit 17 that controls the operation of the magnetic bearing 2. The magnetic-bearing control circuit 17 controls the excitation of an upper radial electromagnet and a lower radial electromagnet that radially support the rotor according to a detected value of a radial sensor for detecting a radial displacement of the rotor. Furthermore, the magnetic-bearing control circuit 17 controls the excitation of an axial electromagnet that axially supports the rotor according to a detected value of an axial sensor for detecting an axial displacement of the rotor.

Moreover, the motor control circuit 16 detects the occurrence of a power failure based on the detected value of the power-failure detection circuit 14, the detected value of the driving-voltage sensing circuit 15, and kinds of setting values and controls the operation of the motor driving circuit 11 so as to provide the regenerated power of the motor 3 for the turbo molecular pump 1 in the event of a power failure.

Figure 2:
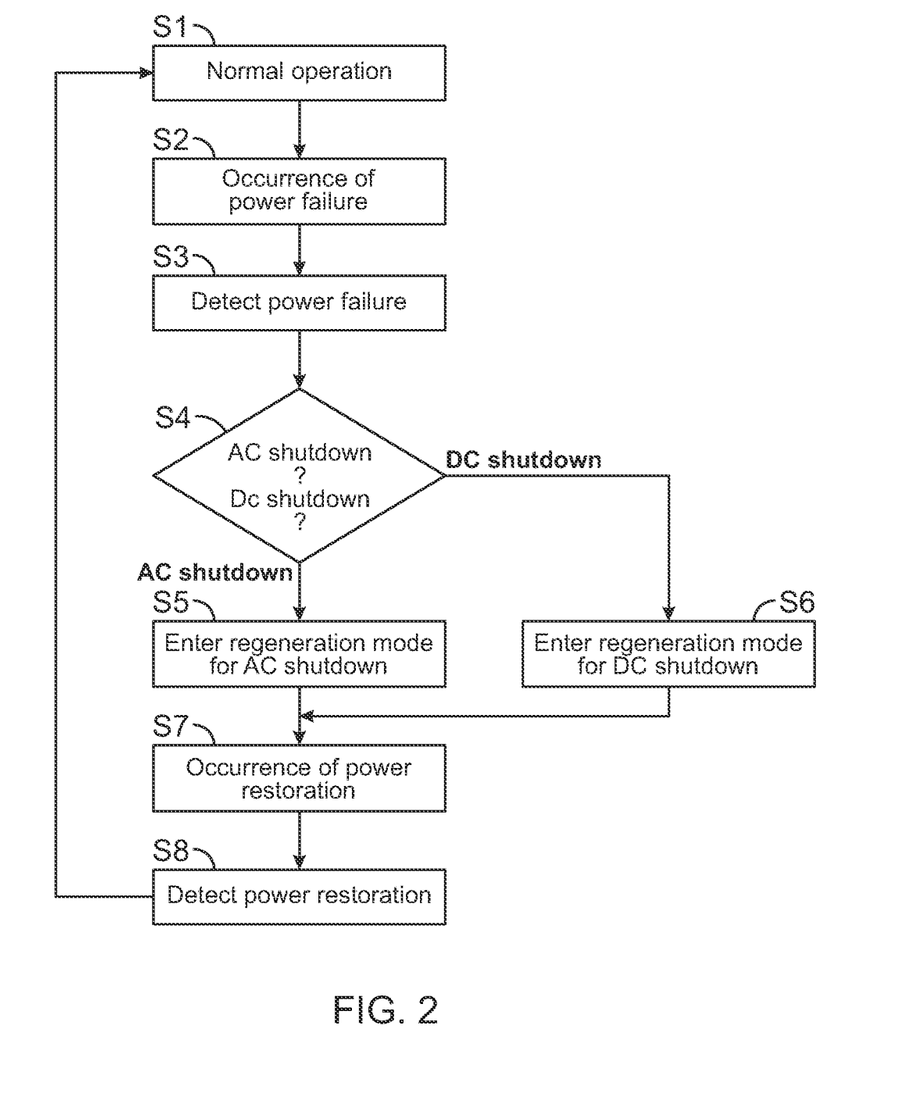
FIG. 2 is a flowchart of the actions of the motor controller according to the present embodiment.

The actions of the motor controller 10 will be described below in accordance with the accompanying drawings. FIG. 2 is a flowchart of the actions of the motor controller 10.

The operation of the turbo molecular pump 1 is started in a normal operation mode in which the magnetic bearing 2 and the motor 3 are started by power supplied from an external power supply (S1).

When power supply to motor controller 10 is stopped (S2) and the primary voltage of the backflow prevention diode 12 drops to a power-failure detection threshold value, the motor control circuit 16 detects the occurrence of a power failure (S3). The power-failure detection threshold value of the primary voltage of the backflow prevention diode 12 can be optionally changed. For example, if a commercial power supply has a voltage of 24 V, a power-failure detected value may be set at 20 V.

When a power failure is detected, the motor control circuit 16 determines which one of a failure between the commercial power supply and the power supply unit 4 (AC shutdown) or a power failure between the power supply unit 4 and the motor controller 10 (DC shutdown) has occurred (S4).

Specifically, when the primary voltage of the backflow prevention diode 12 drops to the power-failure detection threshold value, if a voltage difference between a voltage detected by the power-failure detection circuit 14 and a voltage detected by the driving-voltage sensing circuit 15 is substantially equal to a voltage drop (e.g., 0.6 V) in the backflow prevention diode 12, the motor control circuit 16 determines that the power failure is AC shutdown. If the voltage difference is larger than the voltage drop in the backflow prevention diode 12, the motor control circuit 16 determines that the power failure is DC shutdown.

More specifically, when a power failure is detected, a voltage difference between a voltage detected by the power-failure detection circuit 14 and a voltage detected by the driving-voltage sensing circuit 15 is, in other words, a voltage difference between the primary voltage and the secondary voltage of the backflow prevention diode 12. If the voltage difference is substantially equal to the voltage drop in the backflow prevention diode 12, it is assumed that the first smoothing capacitor 5 and the second smoothing capacitor 13 are similarly discharged. In this case, the motor control circuit 16 determines that the power supply unit 4 and the motor controller 10 are electrically connected to each other and the power failure is AC shutdown.

Meanwhile, if a voltage difference between the primary voltage and the secondary voltage of the backflow prevention diode 12 is larger than a voltage drop in the backflow prevention diode 12, it is assumed that the second smoothing capacitor 13 is discharged so as to gradually reduce the secondary voltage of the backflow prevention diode 12, whereas the first smoothing capacitor 5 is not discharged and the primary voltage of the backflow prevention diode 12 rapidly drops. In this case, the motor control circuit 16 determines that the power supply unit 4 and the motor controller 10 are not electrically connected to each other and the power failure is DC shutdown.

If the motor control circuit 16 determines that a power failure is AC shutdown, the motor control circuit 16 immediately enters from the normal operation mode to a regeneration mode in which the devices in the motor controller 10 are driven by regenerated power generated according to the rotation of the rotor (S5).

Figure 3:
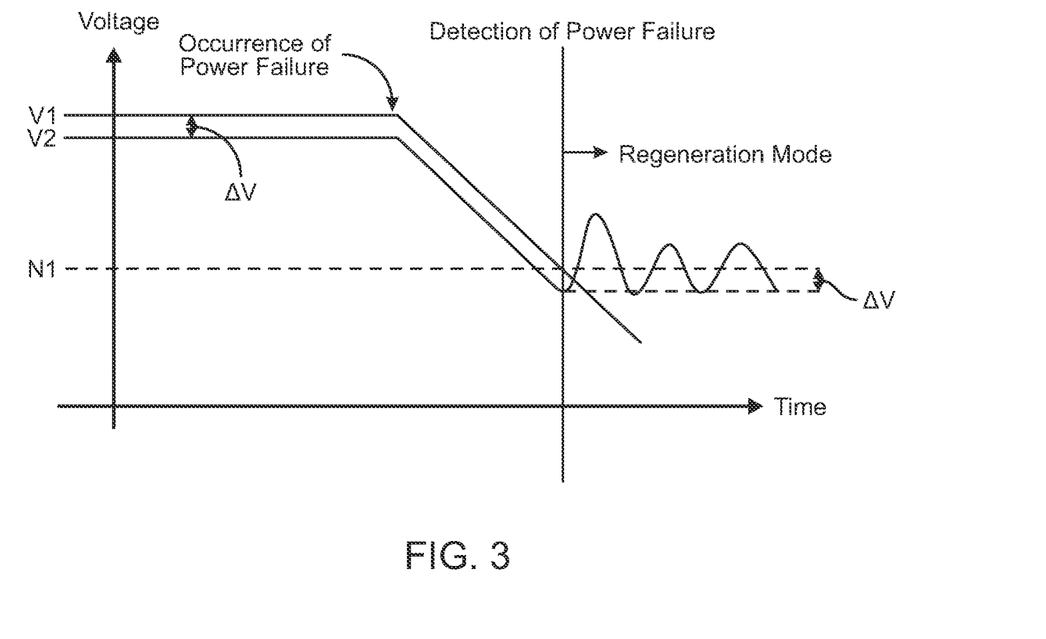
FIG. 3 illustrates a state of a power drop during AC shutdown.

As indicated in FIG. 3, when the primary voltage of the backflow prevention diode 12 drops to a power-failure detection threshold value N1, a secondary voltage V2 of the backflow prevention diode 12 is lower than a primary voltage V1 of the backflow prevention diode 12 by a voltage drop ΔV of the backflow prevention diode 12. Thus, a margin is ensured between the secondary voltage V2 of the backflow prevention diode 12 and an overvoltage (e.g., 30 V) that may adversely affect the devices. Therefore, even an overshoot (e.g., 2 to 3 V) at a transition to the regeneration mode does not reach the overvoltage and is suppressed within a target voltage during the regeneration mode. In FIG. 3, the target voltage is set at but is not limited to the same value as the power-failure detection threshold value N1.

At a transition to the regeneration mode, the motor control circuit 16 preferably adjusts the maximum value of a current command value of the motor 3 based on the rotational speed of the motor 3. As the rotational speed of the motor 3 rises, the regenerated power increases but the need for optionally changing the control parameter of the motor control circuit 16 according to regenerated power is eliminated by keeping the maximum value of the current command value of the motor 3 according to the rotational speed of the motor 3, achieving simple and general-purpose control.

The maximum value of the current command value of the motor 3 may be adjusted as follows: for example, a table in which a maximum value of the current command value of the motor 3 is defined according to a rotational speed of the motor 3 is stored in advance, and the maximum value of the current command value of the motor 3 is retrieved from an actual rotational speed of the motor 3 at a transition to the regeneration mode and the table. In this case, the higher the rotational speed of the motor 3, the smaller the maximum value of the current command value of the motor 3.

If the motor control circuit 16 determines that a power failure is DC shutdown, the motor control circuit 16 enters the regeneration mode from the normal operation mode after the secondary voltage of the backflow prevention diode drops to the power-failure detection threshold value (S6).

Figure 4:
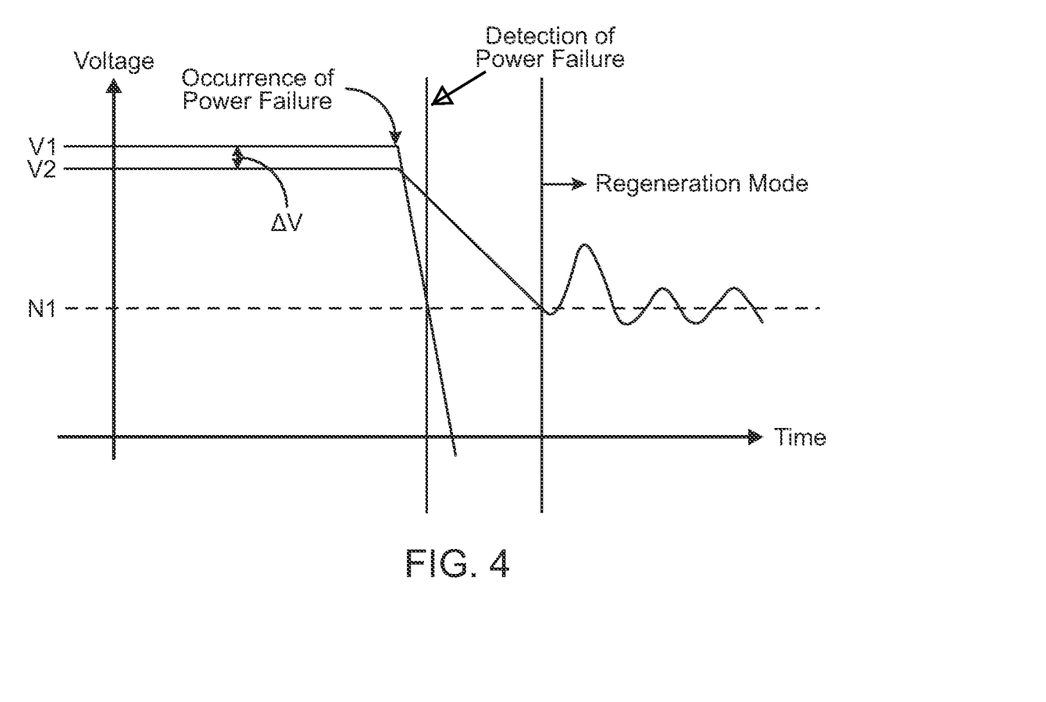
FIG. 4 illustrates a state of a power drop during DC shutdown.

As indicated in FIG. 4, in the case of DC shutdown, the secondary voltage V2 of the backflow prevention diode 12 does not sufficiently drops even when the primary voltage V1 of the backflow prevention diode 12 decreases to the power-failure detection threshold value N1. Thus, in order to ensure a margin between the secondary voltage V2 of the backflow prevention diode 12 and the overvoltage at a transition to the regeneration mode, the transition is made to the regeneration mode after the secondary voltage V2 of the backflow prevention diode 12 drops to a regeneration-mode transition threshold value, thereby suppressing the occurrence of an overvoltage caused by an overshoot. In the present embodiment, the regeneration-mode transition threshold value is set at but not limited to the same value as the power-failure detection threshold value N1. The regeneration mode may be started after a lapse of a predetermined time as well as when the secondary voltage V2 decreases to the power-failure detection threshold value N1. The predetermined time may be, for example, a time period set in advance based on an actual measurement of a drop of the secondary voltage V2.

Also in the case of DC shutdown, at a transition to the regeneration mode, the motor control circuit 16 preferably adjusts the maximum value of the current command value of the motor 3 based on the rotational speed of the motor 3, similarly to the case of AC shutdown. Furthermore, in the case of DC shutdown, the secondary voltage V2 of the backflow prevention diode 12 at a transition to the regeneration mode is slightly higher than that of AC shutdown by the voltage drop ΔV of the backflow prevention diode 12. Thus, in the case of DC shutdown, the maximum value of the current command value of the motor 3 is preferably set smaller than that of AC shutdown even if the rotational speed of the motor 3 is kept constant. This can further suppress the occurrence of an overvoltage at a transition to the regeneration mode.

Thereafter, a power failure is resolved (S7) and the power-failure detection circuit 14 detects that the primary voltage of the backflow prevention diode 12 has reached a power-restoration detection threshold value (e.g., 21 V) (S8). At this point, the motor control circuit 16 terminates the regeneration mode and enters the normal operation mode in which the turbo molecular pump is operated by power supplied from an external power supply.

As described above, when a power failure occurs and the normal operation mode is switched to the regeneration mode, the turbo molecular pump 1 according to the present embodiment determines whether the power failure is AC shutdown or DC shutdown based on a voltage difference between the primary voltage and the secondary voltage of the backflow prevention diode 12. If it is determined that the power failure is DC shutdown, a transition is made to the regeneration mode after the secondary voltage of the backflow prevention diode 12 drops to the predetermined regeneration-mode transition threshold value. This suppresses the occurrence of an overvoltage caused by an overshoot of voltage at a transition to the regeneration mode, achieving a safe transition to the regeneration mode.

Moreover, when a power failure occurs and the normal operation mode is switched to the regeneration mode, the motor controller 10 according to the present embodiment determines whether the power failure is AC shutdown or DC shutdown based on a voltage difference between the primary voltage and the secondary voltage of the backflow prevention diode 12. If it is determined that the power failure is DC shutdown, a transition is made to the regeneration mode after the secondary voltage of the backflow prevention diode 12 drops to the predetermined regeneration-mode transition threshold value. This suppresses the occurrence of an overvoltage caused by an overshoot of voltage at a transition to the regeneration mode, achieving a safe transition to the regeneration mode.

The present disclosure can be modified in various ways in addition to the foregoing modification without departing from the scope of the present disclosure. The present disclosure is naturally extended to the modifications.

What is claimed is:

1. A vacuum pump comprising:
   a motor that generates regenerated power according to a rotation of a rotor during a power failure;
   a power supply unit that converts alternating-current power to direct-current power and outputs the direct-current power, the alternating-current power being obtained from an alternating-current power supply; and a motor controller that controls the motor, the motor controller comprising:
  a motor driving circuit that drives the motor when receiving one of the direct-current power and the regenerated power;
  a backflow prevention diode interposed between the power supply unit and the motor driving circuit;
  a power-failure detection circuit that detects a primary voltage of the backflow prevention diode;
  a driving-voltage sensing circuit that detects a secondary voltage of the backflow prevention diode; and
  a motor control circuit that determines, when the primary voltage drops to a predetermined power-failure detection threshold value, whether the power failure is a primary power failure of the alternating-current power or a secondary power failure of the direct-current power based on a voltage difference between the primary voltage and the secondary voltage; and controls the motor driving circuit so as to enter a regeneration mode in which the motor is driven by the regenerated power.

2. The vacuum pump according to claim 1, wherein if the motor control circuit determines that the power failure is the primary power failure, the motor control circuit controls the motor driving circuit so as to immediately enter the regeneration mode.

3. The vacuum pump according to claim 1, wherein if the control circuit determines that the power failure is the secondary power failure, the motor control circuit controls the motor driving circuit so as to enter the regeneration mode after the secondary voltage drops to a predetermined regeneration-mode transition threshold value.

4. The vacuum pump according to claim 1, wherein if the motor control circuit determines that the power failure is the secondary power failure, the motor control circuit controls the motor driving circuit so as to enter the regeneration mode after a lapse of a predetermined time from start of a reduction of the secondary voltage.

5. The vacuum pump according to claim 3, wherein the motor driving circuit sets a maximum value of a current command value of the regeneration mode during the secondary power failure such that the maximum value is smaller than a maximum value of a current command value during the primary power failure.

6. The vacuum pump according to claim 1, wherein the motor control circuit adjusts a maximum value of a current command value of the motor according to a rotational speed of the rotor at a transition to the regeneration mode.

7. A motor controller used for a vacuum pump, the motor controller comprising:
  a motor driving circuit that drives a motor when receiving one of a direct-current power and a regenerated power;
  a backflow prevention diode interposed between a power supply unit and a motor driving circuit;
  a power-failure detection circuit that detects a primary voltage of the backflow prevention diode;
  a driving-voltage sensing circuit that detects a secondary voltage of the backflow prevention diode; and
  a motor control circuit that determines, when the prima voltage drops to a predetermined power-failure detection threshold value, whether the power failure is a primary power failure of the alternating-current power or a secondary power failure of the direct-current power based on a voltage difference between the primary voltage and the secondary voltage, and controls the motor driving circuit so as to enter a regeneration mode in which the motor is driven b the regenerated power.

8. The motor controller according to claim 7, wherein if the motor control circuit determines that the power failure is the primary power failure, the motor control circuit controls the motor driving circuit so as to immediately enter the regeneration mode.

9. The motor controller according to claim 7, wherein if the control circuit determines that the power failure is the secondary power failure, the motor control circuit controls the motor driving circuit so as to enter the regeneration mode after the secondary voltage drops to a predetermined regeneration-mode transition threshold value.

10. The motor controller according to claim 7, wherein if the motor control circuit determines that the power failure is the secondary power failure, the motor control circuit controls the motor driving circuit so as to enter the regeneration mode after a lapse of a predetermined time from start of a reduction of the secondary voltage.

11. The motor controller according to claim 9, wherein the motor driving circuit sets a maximum value of a current command value of the regeneration mode during the secondary power failure such that the maximum value is smaller than a maximum value of a current command value during the primary power failure.

12. The motor controller according to claim 7, wherein the motor control circuit adjusts a maximum value of a current command value of the motor according to a rotational speed of the rotor at a transition to the regeneration mode.

* * * * *